United States Patent
Peflof et al.

(10) Patent No.: US 10,376,113 B2
(45) Date of Patent: Aug. 13, 2019

(54) SUCTION DEVICE AND METHOD FOR OPERATING A SUCTION DEVICE

(71) Applicant: Alfred Kärcher GmbH & Co. KG, Winnenden (DE)

(72) Inventors: Gábor Peflof, Winnenden (DE); Andreas Seibold, Kernen (DE); Florian Ebert, Kernen (DE); Juergen Frank, Kirchberg (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 203 days.

(21) Appl. No.: 15/646,783

(22) Filed: Jul. 11, 2017

(65) Prior Publication Data
US 2017/0340179 A1 Nov. 30, 2017

Related U.S. Application Data

(63) Continuation of application No. PCT/EP2015/053840, filed on Feb. 24, 2015.

(30) Foreign Application Priority Data

Jan. 13, 2015 (DE) .................. 10 2015 100 426
Jan. 13, 2015 (WO) .............. PCT/EP2015/050500

(51) Int. Cl.
*A47L 9/00* (2006.01)
*A47L 9/28* (2006.01)
(Continued)

(52) U.S. Cl.
CPC .............. *A47L 9/0081* (2013.01); *A47L 9/20* (2013.01); *A47L 9/2884* (2013.01);
(Continued)

(58) Field of Classification Search
CPC ........ A47L 9/0081; A47L 9/20; A47L 9/2284; F16K 17/042; F16K 31/0655; B01D 46/0067
See application file for complete search history.

(56) References Cited

U.S. PATENT DOCUMENTS 5,700,527 A 12/1997 Fuchs et al.
6,243,913 B1 6/2001 Frank et al.
(Continued)

FOREIGN PATENT DOCUMENTS

CN 100 372 489 3/2008
DE 195 17 197 11/1996
(Continued)

*Primary Examiner* — Dung Van Nguyen
(74) *Attorney, Agent, or Firm* — Womble Bond Dickinson (US) LLP

(57) ABSTRACT

A suction unit comprising a suction apparatus, a dirt collection container, a filter device, wherein the dirt collection container is connected in terms of flow via the filter device to the suction apparatus, and a cleaning device for the filter device, which cleaning device comprises an external-air valve device, and at least one guide duct for air, which at least one guide duct has a first port which is connected in terms of fluid action to the cleaning device for the provision of external air from the at least one guide duct, a second port for the coupling of exhaust air of the suction apparatus into the at least one guide duct, and a third port which is connected in terms of fluid action to the surroundings of the suction unit, wherein air from the surroundings is configured to flow into the at least one guide duct via the third port.

37 Claims, 9 Drawing Sheets

(51) Int. Cl.
    *F16K 17/04*     (2006.01)
    *B01D 46/00*     (2006.01)
    *A47L 9/20*     (2006.01)
    *F16K 31/06*     (2006.01)

(52) U.S. Cl.
    CPC ........ *F16K 17/042* (2013.01); *F16K 31/0655* (2013.01); *B01D 46/0067* (2013.01)

(56) References Cited

U.S. PATENT DOCUMENTS

| | | | |
|---|---|---|---|
| 9,380,919 B2 | 7/2016 | Hensel et al. | |
| 2008/0086835 A1* | 4/2008 | Stewen | A47L 9/0072 15/347 |
| 2008/0092498 A1* | 4/2008 | Stewen | B01D 46/10 55/283 |
| 2009/0193612 A1* | 8/2009 | Weiss | A47L 9/0081 15/347 |
| 2009/0205158 A1* | 8/2009 | Eckstein | A47L 9/20 15/347 |
| 2009/0205159 A1* | 8/2009 | Stewen | A47L 9/20 15/347 |
| 2009/0205491 A1* | 8/2009 | Eckstein | A47L 9/20 95/68 |
| 2009/0205499 A1* | 8/2009 | Eckstein | A47L 9/20 95/279 |

FOREIGN PATENT DOCUMENTS

| | | |
|---|---|---|
| DE | 10 2010 029 524 | 12/2011 |
| EP | 0 399 433 | 11/1990 |
| EP | 1 120 075 | 8/2001 |
| EP | 1 303 209 | 12/2006 |
| EP | 2 657 932 | 10/2013 |
| EP | 1 785 080 | 1/2014 |
| GB | 2 501 992 | 11/2013 |
| JP | 2007 111308 | 5/2007 |
| JP | 2009-100840 | 5/2009 |

\* cited by examiner

SUCTION DEVICE AND METHOD FOR OPERATING A SUCTION DEVICE

CROSS-REFERENCE TO RELATED APPLICATIONS

This application is a continuation of International Application Number PCT/EP2015/053840 filed on Feb. 24, 2015, which claims the benefit of International Application Number PCT/EP2015/050500 filed on Jan. 13, 2015 and German Application Number 10 2015 100 426.7 filed on Jan. 13, 2015, which are incorporated herein by reference in their entireties and for all purposes.

BACKGROUND OF THE INVENTION

The invention relates to a suction unit comprising a suction apparatus, a dirt collection container, a filter device, wherein the dirt collection container is connected in terms of flow via the filter device to the suction apparatus, and a cleaning device for the filter device, which cleaning device comprises an external-air valve device.

The invention also relates to a method for operating a suction unit, wherein the suction unit comprises a suction apparatus, a dirt collection container, a filter device, wherein the dirt collection container is connected in terms of flow via the filter device to the suction apparatus, and a cleaning device for the filter device, which cleaning device comprises an external-air valve device.

WO 2012/107103 A1 describes a method for cleaning a filter of a vacuum cleaner, in which method the suction power of a suction apparatus is increased in order to transfer an external-air valve into an open valve position and is later reduced again.

SUMMARY OF THE INVENTION

In accordance with the present invention, a suction unit is provided, in the case of which effective filter cleaning is achieved.

In accordance with an embodiment of the invention, at least one guide duct for air is provided, which at least one guide duct has a first port which is connected in terms of fluid action to the cleaning device for the provision of external air from the at least one guide duct, a second port for the coupling of exhaust air of the suction apparatus into the at least one guide duct, and a third port which is connected in terms of fluid action to the surroundings of the suction unit, wherein air from the surroundings is configured to flow into the at least one guide duct via the third port.

In the suction unit according to the invention, exhaust air is used in targeted fashion as external air for a cleaning process of the filter device. In the at least one guide duct, the exhaust air is conducted in targeted fashion and provided at the first port.

By means of the at least one guide duct, a type of bypass for exhaust-air guidance is provided.

The exhaust air is provided simply by means of positive pressure from the suction apparatus. In general, a corresponding volume flow exists, wherein a corresponding positive pressure prevails. Effective cleaning can thus be achieved.

Exhaust air is air that has already been filtered. It is generally less contaminated than ambient air. Back-flushed air is thus in turn cleaner. An increase of the service life of the suction apparatus can thus be achieved.

By means of the additional coupling-in of air from the surroundings via the third port into the at least one guide duct, the flow resistance can be reduced, and effective cleaning is achieved.

By means of targeted flow guidance in the at least one guide duct, it is also possible to achieve an effective noise reduction.

It is provided in particular that the third port is designed such that exhaust air of the suction apparatus is configured to emerge into the surroundings at said third port. It is then possible for exhaust air to be conducted from the first port to the third port and to be released to the surroundings there, wherein the exhaust air flows past the first port and is then available as external air during the filter cleaning process.

In particular, the at least one guide duct extends between the second port and the third port. In this way, guidance of air between the second port and the third port can be achieved. Furthermore, guidance of air at least from the third port to the first port is also achieved.

It is expedient if the first port is, with regard to flow guidance and/or geometrically, positioned between the second port and the third port and in particular at least approximately centrally between the second port and the third port. Here, a position geometrically inbetween means that a connecting line between the second port and the third port passes through the first port or passes through a central plane of the first port. It is thus possible to achieve symmetrical flow guidance on a housing of the suction unit. Effective filter cleaning can thus be realized.

In one exemplary embodiment, the at least one guide duct has a first region which has a first extent axis and on which the second port is situated, a second region which has a second extent axis and on which the first port is situated, and a third region which has a third extent axis and on which the third port is situated, wherein the first extent axis and/or the third extent axis are oriented transversely, and in particular perpendicularly, with respect to the second extent axis and, in particular, the first port and the second port are situated at different heights and/or the first port and the third port are situated at different heights. This yields a compact construction with optimized flow guidance.

For the same reason, it is expedient if the first region and/or the third region are arranged laterally adjacent to the cleaning device or filter device.

It is expedient if the at least one guide duct is arranged or formed at least partially on a housing region which covers the dirt collection container and/or the filter device and/or the cleaning device.

In one exemplary embodiment, the at least one guide duct and the second port are formed such that the entirety of the exhaust air of the suction apparatus enters the at least one guide duct. In this way, the entirety of the exhaust air is guided past the first port. This yields an effective cleaning function. Furthermore, a good noise reduction can be achieved with corresponding guidance of the flow. Then, if no filter cleaning process is performed, the entirety of the exhaust air that is coupled in via the second port emerges into the surroundings at the third port.

It is then expedient if the at least one guide duct and the third port are formed such that, outside a cleaning process of the filter device, exhaust air of the suction apparatus is configured to emerge into the surroundings only at the third port.

In particular, a first inflow region for air to the first port is provided, which first inflow region is formed between the second port and the first port, and a second inflow region is provided which is formed between the third port and the first port. Via the first inflow region, exhaust air of the suction apparatus can be provided as external air. Via the second inflow region, air from the surroundings can be provided as external air. If, for example, no exhaust air or insufficient exhaust air is available (for example because a suction hose is blocked), then air from the surroundings can at least temporarily serve as external air. If both exhaust air and air from the surroundings is available, then the flow resistance can be correspondingly reduced. This can for example contribute to a minimization of noise.

In a further exemplary embodiment, a fourth port for exhaust air of the suction apparatus is arranged on the at least one guide duct. In this way, it is for example possible to realize symmetrical guidance of exhaust air with respect to the first port. In particular, exhaust air can be coupled into the at least one guide duct at different points thereof.

For the same reason, it is then expedient if a fifth port to the surroundings is arranged on the at least one guide duct. It is then possible for air from the surroundings to enter the at least one guide duct at a location other than the third port. With corresponding arrangement of the second port, third port, fourth port and fifth port, it is possible to achieve symmetrical guidance with regard to exhaust air and air from the surroundings.

It is expedient if the filter device and/or the cleaning device are positioned geometrically between the third port and the fifth port. A connecting line between the third port and the fifth port then passes through the filter device or the cleaning device. In this way, it is possible to realize a symmetrical construction with symmetrical air guidance with respect to the cleaning device.

For the same reason, it is expedient if the third port and the fifth port are positioned on opposite housing sides. It is possible to achieve optimized and in particular symmetrical flow guidance using structurally simple means.

It is likewise expedient if the filter device and/or the cleaning device are positioned geometrically between the second port and the fourth port. It is thus possible to achieve symmetrical flow guidance using simple structural means.

It is furthermore expedient if the at least one guide duct is formed mirror-symmetrically with respect to the third port and fifth port and/or the first port and the fourth port, wherein in particular, the first port lies on a mirror plane. This yields symmetrical flow guidance.

In particular, mirror-symmetrical flow guidance for the air guidance to the first port is achieved. This yields optimized filter cleaning.

It is furthermore expedient if the fifth port is situated on the same housing side region as the second port, and the fourth port is arranged on the same housing side region as the third port. In this way, symmetrical flow guidance can be achieved.

In particular, a first inflow region for air to the first port is formed, which first inflow region is formed between the second port and the first port, a second inflow region is formed which is formed between the third port and the first port, a third inflow region is provided which is formed between the fourth port and the first port, and a fourth inflow region is provided which is formed between the fifth port and the first port, wherein in particular, the first inflow region and the third inflow region are mirror-symmetrical with respect to one another, and in particular, the second inflow region and the fourth inflow region are mirror-symmetrical with respect to one another. Symmetrical flow guidance can thus be achieved. Sufficient external air is provided to the first port.

In one exemplary embodiment, it is provided that at least one perforated-plate resonator is acoustically associated with the cleaning device, wherein the at least one perforated-plate resonator has a chamber with a chamber space and with a chamber wall and has at least one perforated plate which covers the chamber space.

A perforated-plate resonator (perforated-plate absorber) has, above the chamber space, a resonator space which is delimited in particular on one side by a perforated plate. By means of a perforated-plate resonator, it is possible for noises in particular in the low frequency range (in particular lower than or equal to 2000 Hz) to be reduced in an effective manner by sound absorption. The sound absorption in a perforated-plate resonator is realized by means of friction of an oscillating air column against an opening wall of the perforated plate of the perforated-plate resonator. A cleaning device can form a noise source for low-frequency noises. Such noises can be damped in an effective manner by means of the association with a perforated-plate resonator. In particular, banging noises that occur as a result of the operation of the cleaning device can be damped. The at least one perforated plate is a plate which is equipped with a multiplicity of openings. Said perforated plate is acoustically connected to the corresponding noise source of the suction unit, that is to say sound waves of the noise source propagate in the direction of the perforated plate. At the perforated-plate resonator, it is then possible for sound absorption to be achieved with an effective noise reduction.

A perforated-plate resonator is defined in particular by its resonance frequency (center frequency), the geometrical dimensions of the chamber space, the geometrical dimensions of the openings in the perforated plate, and the arrangement of the openings on the perforated plate, in particular in terms of the ratio of the area of an opening of a perforated plate to the overall area of the perforated plate. Through corresponding dimensioning, an effective noise reduction can be achieved for one or more specific noise sources.

The stated frequency range for the noise emission does not mean that noises are emitted only in said frequency range. Higher-frequency noises may also arise. The at least one perforated-plate resonator serves in particular for damping the low-frequency noises below, for example, 2000 Hz. In the case of an exhaust-air cleaning device, the higher-frequency noises are generally negligible in relation to the low-frequency noises.

In one exemplary embodiment, the chamber wall has a top wall, which is situated opposite the at least one perforated plate, and has a (lateral) wall which is situated between the top wall and the at least one perforated plate. The (lateral) wall forms side walls laterally surrounding the chamber space.

In an exemplary embodiment which is advantageous from a manufacturing aspect, the at least one perforated plate and the top wall are oriented parallel. A corresponding perforated-plate resonator can be easily calculated with regard to its sound absorption characteristics.

For the same reason, it is expedient if the chamber space has a (hollow) cuboidal shape.

In one exemplary embodiment, the at least one perforated plate is (as a whole) of non-planar form, and in particular has a first region, second region and third region, wherein the first region and the second region and the third region are arranged oppositely on the second region and lie at an angle with respect to the second region. The corresponding regions themselves have in particular planar surfaces (wherein through openings are formed at the regions). By means of a corresponding geometrical design of the perforated plate, targeted flow guidance for air can be achieved.

In an exemplary embodiment which is expedient from a manufacturing aspect, the chamber wall has a first transverse wall, a second transverse wall, a first longitudinal wall, a second longitudinal wall and a top wall, wherein the first transverse wall and the second transverse wall are spaced apart and face one another, the first longitudinal wall and the second longitudinal wall are spaced apart from one another and face one another, the first transverse wall and the first longitudinal wall are oriented transversely with respect to one another, and the top wall is oriented transversely with respect to the first transverse wall, the second transverse wall, the first longitudinal wall and the second longitudinal wall. The corresponding perforated-plate resonator has a box shape. Such a perforated-plate resonator can be easily accommodated on a cleaning unit.

For the same reason, it is expedient if the first transverse wall and the second transverse wall are oriented parallel, and/or the first longitudinal wall and the second longitudinal wall are oriented parallel. It is thus possible to realize a perforated-plate resonator which has a cuboidal chamber space. The absorption characteristics of a perforated-plate resonator can be easily calculated in the case of such a configuration. In this way, in turn, an adaptation to given conditions in a cleaning unit is made easily possible, and in particular, a frequency adaptation is made easily possible.

It is expedient if the chamber wall is produced at least partially from an acoustically hard material. An acoustically hard material is to be understood here to mean a material with a reflectance of at least 94%. An acoustically hard material exhibits low sound absorption. An effective noise reduction is then ensured.

It may be provided that a sound absorption material such as for example mineral fiber wool is arranged in at least part of the chamber space. This yields more effective sound absorption.

It is expedient if the at least one perforated-plate resonator and in particular the at least one perforated plate forms a wall (including wall portion) of the at least one guide duct. This yields a compact construction.

It is expedient if the at least one perforated-plate resonator is arranged on, and in particular is fixed to, a housing cover. If, for example, the housing cover is opened, then the perforated-plate resonator is correspondingly moved conjointly. This yields easier access to the cleaning device and the filter device.

According to the invention, a method for operating a suction unit of the type mentioned in the introduction is provided, in which method exhaust air of the suction apparatus is conducted in a defined manner via at least one guide duct to the cleaning device, wherein the exhaust air is discharged from the at least one guide duct via at least one port into the surroundings, and wherein the at least one port is also formed as an inlet port for air from the surroundings, such that air from the surroundings is configured to be fed in the at least one guide duct to the cleaning device.

The method according to the invention has the advantages already discussed in conjunction with the suction unit according to the invention.

In one exemplary embodiment, the entirety of the exhaust air of the suction unit is coupled into the at least one guide duct. Exhaust air not utilized for a cleaning process can emerge into the surroundings only via the at least one port.

The following description of preferred embodiments serves, in conjunction with the drawings, to explain the invention in more detail.

DETAILED DESCRIPTION OF THE INVENTION

Figure 1:
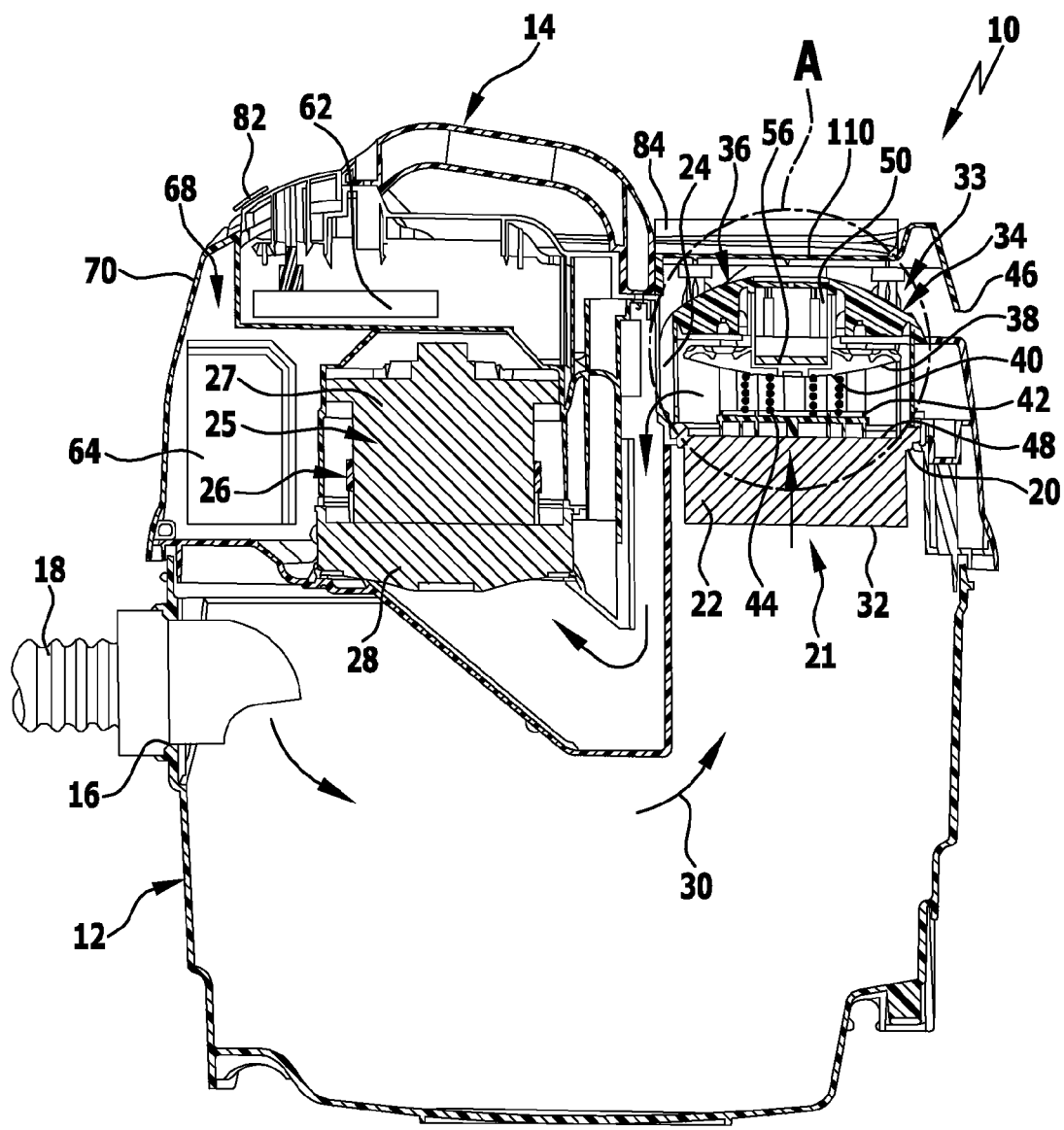
FIG. 1 shows a schematic sectional view of an exemplary embodiment of a suction unit.

An exemplary embodiment of a suction means (vacuum cleaner) 10 as an example of a cleaning unit, which is illustrated schematically in FIG. 1 in a sectional view, has a dirt collection container 12 onto which a suction head 14 is mounted. The vacuum cleaner 10 is formed as an example of a vacuum cleaner apparatus and as a stand-alone unit (as an autonomous unit).

The dirt collection container 12 has a suction inlet 16 to which, in the conventional manner, a suction hose 18 can be connected. The suction head 14 seals off the dirt collection container 12 at the top side and forms a suction outlet 20 on which a filter device 21 with a (at least one) filter 22 is held. The filter 22 is adjoined by a suction-extraction line 24 by means of which the dirt collection container 12 is connected in terms of flow to a suction apparatus 26. The suction apparatus 26 comprises an electric motor device 25 with a (at least one) electric motor 27 and a blower 28 which is driven in rotation by the electric motor 27.

During operation of the vacuum cleaner 10, the dirt collection container 12 is charged with negative pressure by the suction apparatus 26, such that a suction flow illustrated in FIG. 1 by the arrows 30 is generated. Under the action of the suction flow 30, suction air laden with dirt can be sucked into the dirt collection container 12 via the suction inlet 16, which suction air can then be extracted by suction by the suction apparatus 26. The suction air can be discharged to the surroundings by the suction apparatus 26 via exhaust-air openings 29 (FIG. 7) of the suction head 14.

The suction air flows through the filter 22, such that entrained solid particles are deposited on the dirty side 32, which faces toward the dirt collection container 12, of the filter 22. It is therefore necessary for the filter 22 to be cleaned from time to time, because otherwise it forms an increasing flow resistance, whereby the suction action of the vacuum cleaner 10 is impaired.

Figure 2:
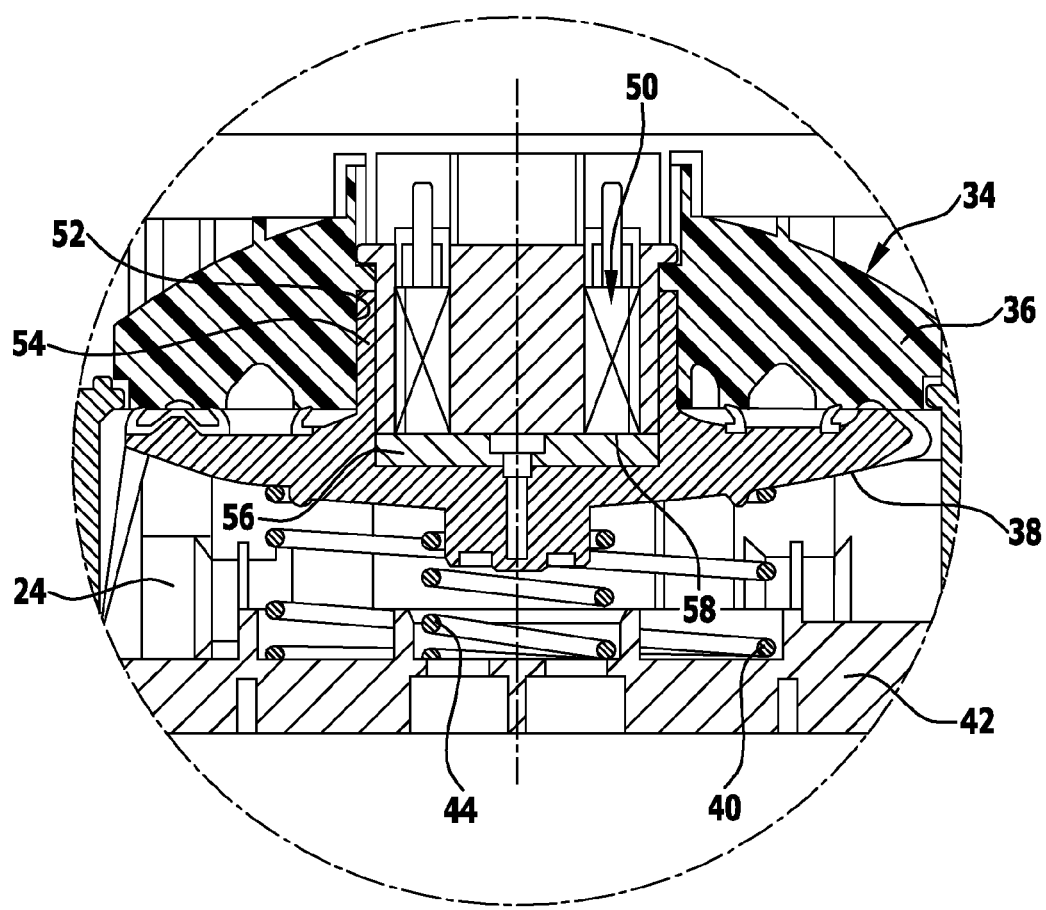
FIG. 2 is an enlarged illustration of an external-air valve device of the suction unit as per FIG. 1.

For the cleaning of the filter 22, a cleaning device which is in the form of an external-air valve device 33 and which has an (at least one) external-air valve 34 is arranged above the filter 22 in the suction head 14 (as illustrated on an enlarged scale in FIG. 2). Said external-air valve comprises a valve holder 36 which is arranged positionally fixedly in the suction head 14 and which forms a valve seat for a movable valve body in the form of a valve disk 38. The valve disk 38 is acted on in the direction of the valve holder 36 by means of a closing spring 40. The closing spring 40 is restrained between a plate-like filter holder 42, which has a multiplicity of flow passages and which is arranged positionally fixedly in the suction head 14, and the valve disk 38. In addition to the closing spring 40, the filter holder 42 bears a resilient stop element in the form of a stop spring 44. The latter has in particular (preferably in the same way as the closing spring 40) a linear characteristic curve. Said stop spring is for example in the form of a helical spring. By contrast to the closing spring 40, the stop spring 44 is not under preload when the valve disk 38 is in the closed position. Only when the valve disk 38 lifts off from the valve seat of the valve holder 36 does the stop spring 44 come into contact with the underside of the valve disk 38 and is compressed slightly during a further movement of the valve disk 38. Said stop spring thus exerts an increasing restoring force on the valve disk 38 and accelerates the movement of the valve disk 38 proceeding from its closed valve position (illustrated in FIG. 2) via an open valve position back into the closed valve position. In the open valve position, the valve disk 38 assumes a spacing to the valve holder 36 which forms the valve seat.

The valve holder 36 has a multiplicity of passage openings (not illustrated in the drawing), the mouth regions of which are closed by the valve disk 38 when the latter assumes its closed valve position. At the level of the valve holder 36, the suction head 14 has a lateral opening 46. External air can flow into the passage openings of the valve holder 36 via the lateral opening 46. If the valve disk 36 assumes its open valve position spaced apart from the valve holder 36, the lateral opening 46 is connected in terms of flow via the passage openings of the valve holder 36 to the suction-extraction line 24, and external air can impinge on the clean side 48, which is averted from the dirt collection container 12, of the filter 22. If the valve disk 38 assumes its closed valve position, the flow connection between the lateral opening 46 and the suction-extraction line 24 is shut off.

In a central region, the valve holder 36 bears an electromagnet 50. The electromagnet 50 is surrounded in a circumferential direction by a ring-shaped space 52 into which a guide sleeve 54 integrally formed on the top side of the valve disk 38 protrudes. The guide sleeve 54 receives a magnetizable element, for example in the form of an iron plate 56, which in the closed valve position of the valve disk 38 bears against a free face edge 58 of the electromagnet 50 and, in combination with the electromagnet 50, forms a closed magnetic circuit.

The electromagnet 50 is electrically connected via a current supply line to an (electronic) control device 62 arranged in the suction head 14. A supply current is fed by the control device 62 to the electromagnet 50 during normal suction operation of the vacuum cleaner 10. Owing to the magnetic field which forms, the valve disk 38 is reliably held in its closed position. The holding force of the electromagnet 50 is assisted by the spring force of the closing spring 40.

If the current supply to the electromagnet 50 is shut off by the control device 62, the magnetic holding force acting on the valve disk 38 is eliminated, and the valve disk 38 is lifted from the valve seat counter to the action of the closing spring 40 owing to the pressure difference which acts on said valve disk and which results from the external pressure of the external air present in the region of the valve holder 36 and the internal pressure within the suction-extraction line 24. External air can then flow into the suction-extraction line 24 through the passage openings of the valve holder 36 in an abrupt manner, and the filter 22 is impinged on with external air on its clean side 48 in an abrupt manner. This leads to a mechanical vibration of the filter 22. Furthermore, external air flows through the filter 22 in the counterflow direction, that is to say counter to the flow direction 30 that prevails during normal suction operation. This results in effective cleaning of the filter 22.

In one exemplary embodiment, the energy supply to the vacuum cleaner 10 is realized by means of a rechargeable battery device. The latter comprises, for example, two rechargeable batteries. The battery device comprises, for example, one or more lithium-ion accumulators. These are arranged, laterally adjacent to the suction apparatus 26, in a battery compartment 68 of the suction head 14. The battery compartment 68 is accessible to the user, for the purposes of exchanging the batteries, by means of an outwardly pivotable flap 70.

The electronic control device 62 is arranged above the suction apparatus 26 in the suction head 14 and is electrically connected to the batteries 64 via supply lines. A pushbutton 82 which can be activated manually by the user is connected to the control device 62 at the input side, which pushbutton is arranged on the top side of the suction head 14. The user can (manually) trigger a filter cleaning process by actuating the pushbutton 82.

The external-air valve device 33 in the suction means 10 is a noise source for banging noises. The sudden ("abrupt") pressure change which leads to a reversed flow direction through the filter 22 leads to low-frequency banging noises. The relevant frequency range normally lies considerably below 1000 Hz. The pressure drop is abrupt and has a time duration of for example less than 0.05 seconds. The pressure change is in particular 50 mbar (5 kPa) or more.

Figure 3:
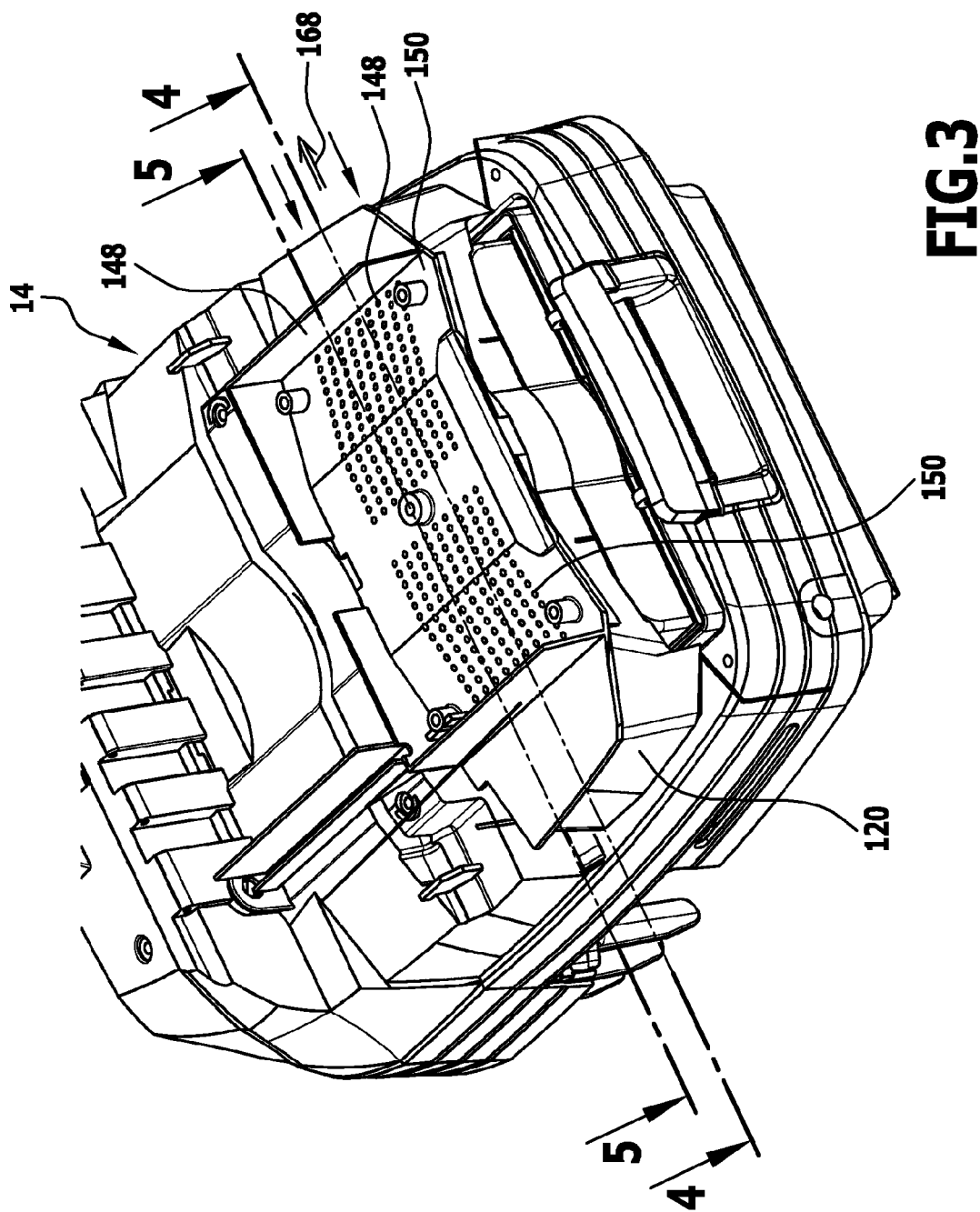
FIG. 3 is a perspective partial illustration of a first exemplary embodiment of a modification of the suction unit as per FIG. 1.
Figure 4:
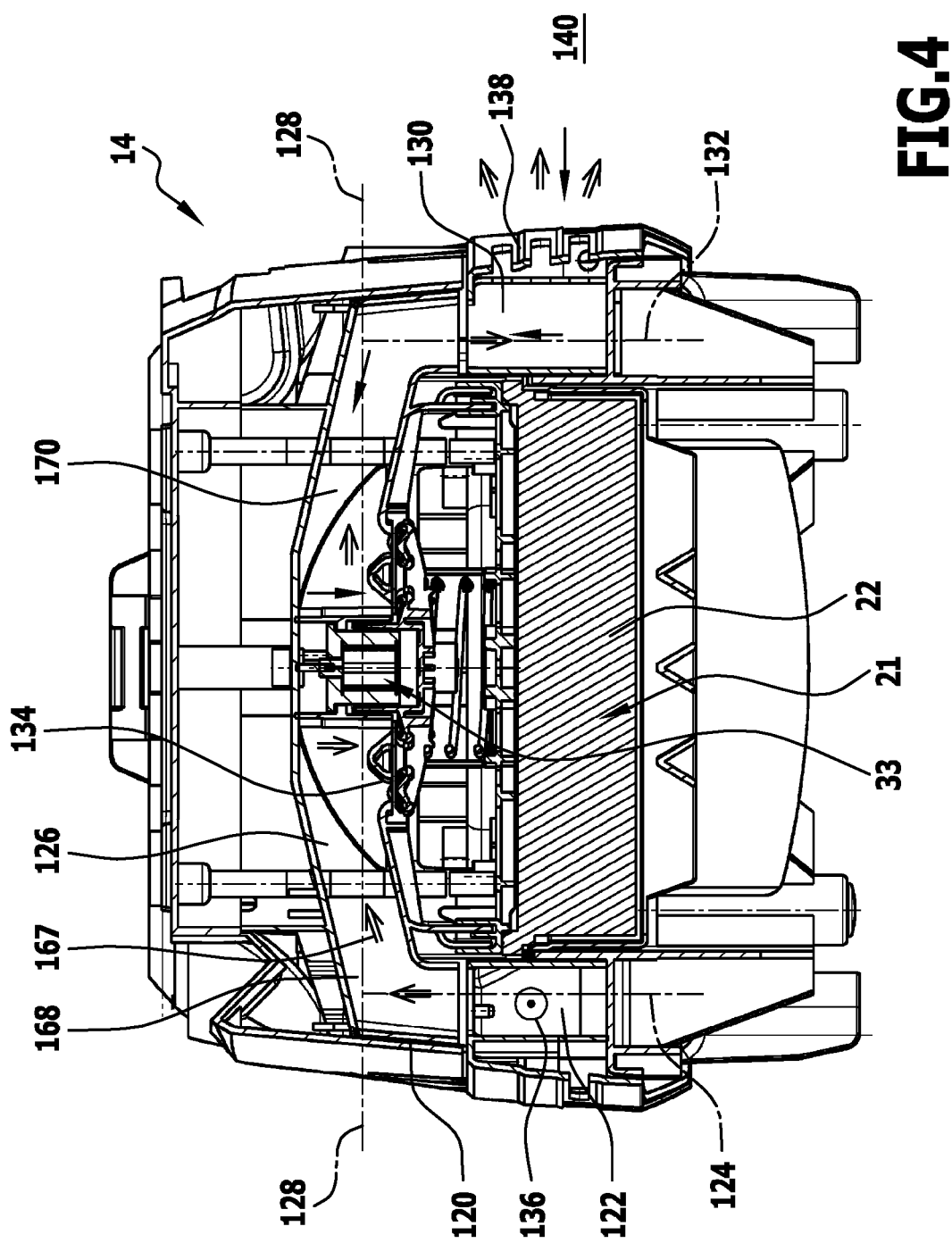
FIG. 4 shows a sectional view along the plane indicated by the line 4-4 in FIG. 3, with a housing cover having been mounted.
Figure 5:
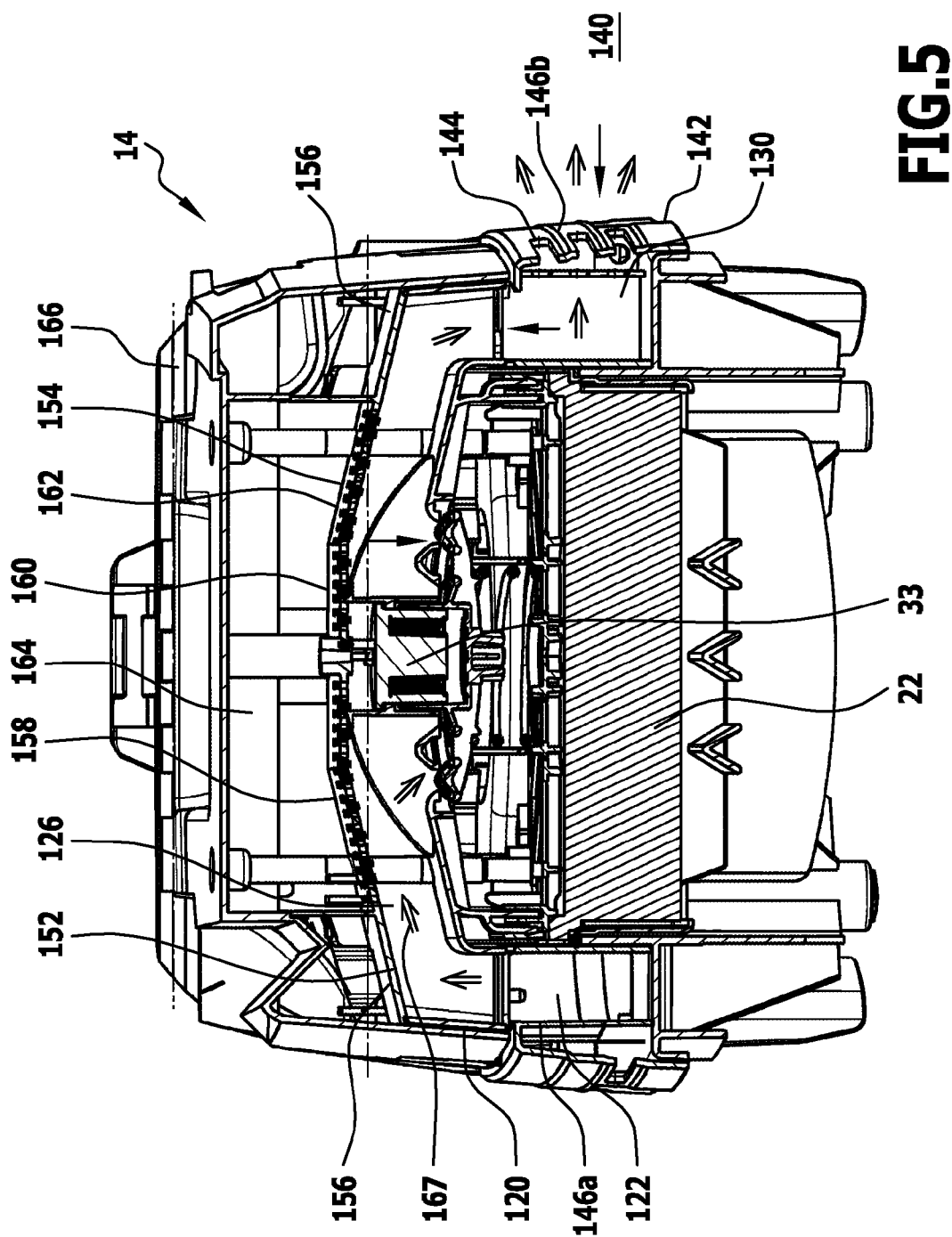
FIG. 5 shows a view similar to FIG. 4 with the section plane indicated by the line 5-5 in FIG. 3.
Figure 6:
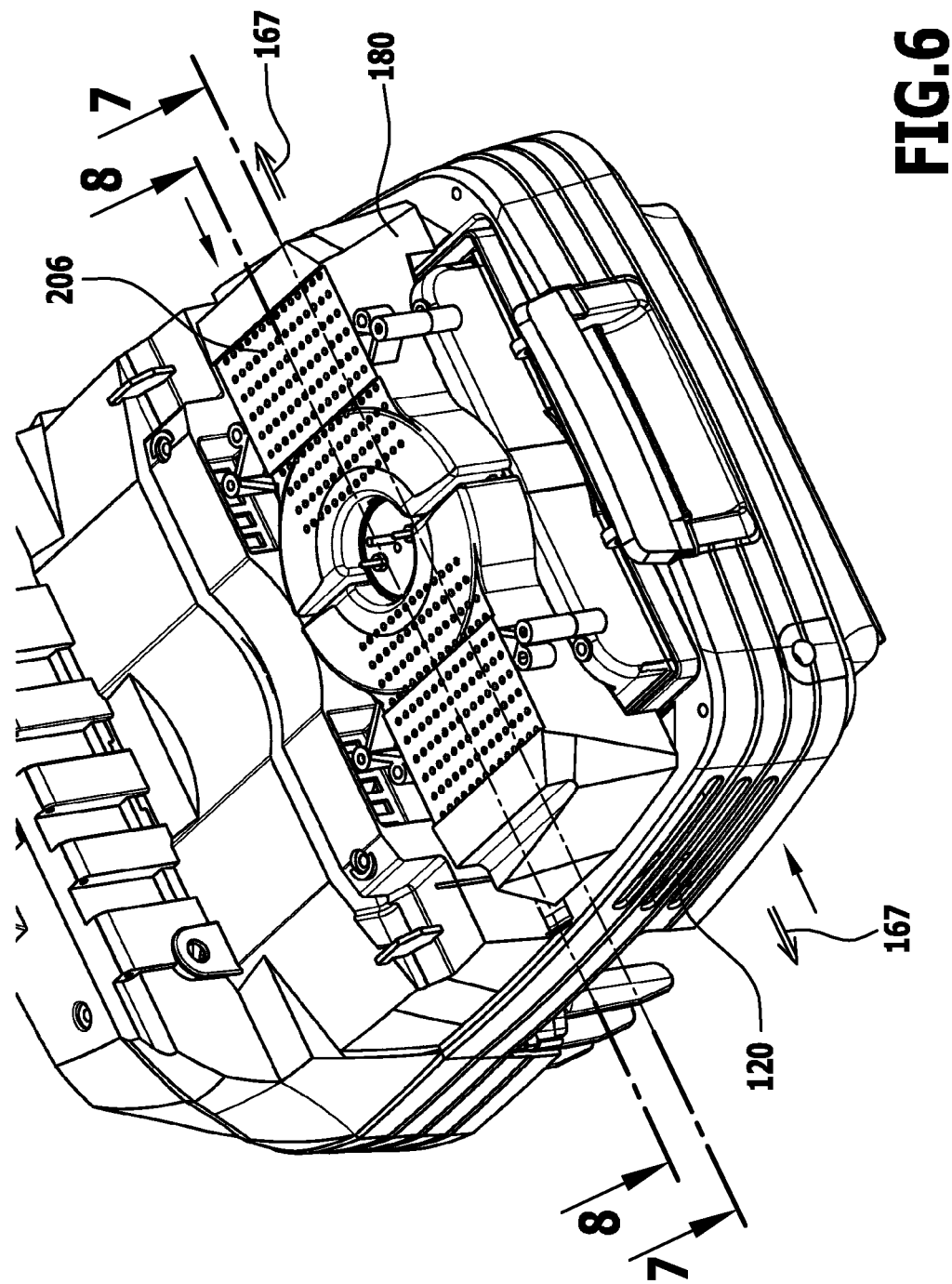
FIG. 6 is a partially perspective illustration of a second exemplary embodiment of a modification of the suction unit as per FIG. 1.

For the noise reduction with regard to said noise source, the suction means 10 is equipped with a perforated-plate resonator 84 (FIGS. 3 to 9; the perforated-plate resonator is denoted by the reference designation 148 in FIG. 3 and by the reference designation 206 in FIG. 6). The perforated-plate resonator 84 is associated with the external-air valve device 33, which forms the noise source, and said perforated-plate resonator is acoustically connected to said external-air valve device.

The perforated-plate resonator 84 has (FIG. 9) a chamber 85 with a chamber wall 86. Said chamber wall 86 delimits a chamber space 88. The chamber space 88 is closed off by a perforated plate 90.

In one exemplary embodiment (FIG. 9), the perforated plate 90 is supported on the chamber wall 86 and is arranged on the latter. For example, the chamber wall 86 is connected to the perforated plate 90.

In one embodiment, the chamber wall 86 comprises a top wall 92. Said top wall 92 is situated spaced apart from and opposite the perforated plate 90. The chamber space 88 is formed between the top wall 92 and the perforated plate 90.

In one embodiment, the perforated plate 90 and the top wall 92 are situated parallel to one another.

The perforated plate 90 has a first side 94. The first side 94 faces toward the chamber space 88. Said first side furthermore faces toward the top wall 92. The perforated plate 90 furthermore comprises a second side 96. The second side 96 is situated opposite the first side 94. The perforated plate 90 extends between the first side 94 and the second side 96.

The second side 96 of the perforated plate 90 faces toward the noise source acoustically (in the case of the suction means 10, the external-air valve device 33). Sound waves can propagate from said noise source toward the perforated plate 90 and enter the chamber space 88 through openings ("holes") in the perforated plate 90.

In one exemplary embodiment (FIG. 9), the first side 94 and the second side 96 are parallel to one another. The perforated plate 90 is then correspondingly of planar form.

In one exemplary embodiment, the perforated-plate resonator 84 comprises a first transverse wall and a second transverse wall. These are spaced apart from one another. They are for example oriented parallel to one another.

The first transverse wall and the second transverse wall are seated on the top wall 92 and project transversely beyond said top wall.

Furthermore, the perforated-plate resonator 84 comprises a first longitudinal wall 102 and a second longitudinal wall 104. The first longitudinal wall 102 and the second longitudinal wall 104 are spaced apart from one another and face toward one another.

The first longitudinal wall 102 and the second longitudinal wall 104 are for example formed parallel to one another.

The first longitudinal wall 102 and the second longitudinal wall 104 are seated on the top wall 92 and project beyond the latter. The first longitudinal wall 102 and the second longitudinal wall 104 lie transversely with respect to the first transverse wall and the second transverse wall. The first transverse wall, the second transverse wall, the first longitudinal wall 102 and the second longitudinal wall 104 form a (lateral) wall 106 which is seated on the top wall 92 and which laterally closes off the chamber space 98. The perforated plate 90 is in turn arranged on said wall 106 and is supported in particular on end sides of said wall 106.

In one exemplary embodiment, the first transverse wall 98, the second transverse wall 100, the first longitudinal wall 102 and the second longitudinal wall 104 are of straight form. The transverse walls are for example arranged at right angles to the longitudinal walls 102, 104. The chamber space 88 then has a hollow cuboidal shape. Other embodiments are also possible, as will be discussed below.

The chamber wall 96 is formed in particular from an acoustically hard material with a reflectance for sound of greater than 94%, which accordingly exhibits a low absorption capacity for sound.

Openings ("holes") 108 are arranged in the perforated plate 90, which openings extend continuously between the first side 94 and the second side 96. At the first side 94, the openings open into the chamber space 88. At the second side 96, the openings 108 open into a duct which conducts sound. The duct is arranged between the noise source, that is to say the external-air valve device 33, and the perforated plate 90.

A multiplicity of openings 108 is formed on the perforated plate 90. Said openings are in particular provided in a regular arrangement. Said openings are in particular arranged on grid points of a two-dimensional grid. Elementary cells of said grid are for example squares, rectangles, trapezoids, triangles etc.

In one exemplary embodiment, the openings 108 have a circular cross section. They thus have a (hollow) cylindrical shape.

A direction of extent 112 of an opening 108 is for example oriented parallel to the transverse walls or longitudinal walls 102, 104. The direction of extent 112 is in particular perpendicular to the first side 94 and second side 96 of the perforated plate 90. Said direction of extent is furthermore in particular oriented perpendicular to the top wall 92.

A sound-absorbing material 114 such as mineral fiber wool may be arranged in the whole of, or in part of, the chamber space 88.

The perforated-plate resonator 84 is a perforated-plate absorber which has sound-absorbing characteristics. The sound-absorbing action is improved by means of an acoustically hard form of the chamber wall 86, that is to say by means of correspondingly low sound absorption capacities of the chamber wall 86.

The dimensioning of the perforated-plate resonator 84 with regard to its geometrical dimensions and the arrangement and dimension of the openings 108 determines the effective frequency range for the sound absorption.

Figure 9:
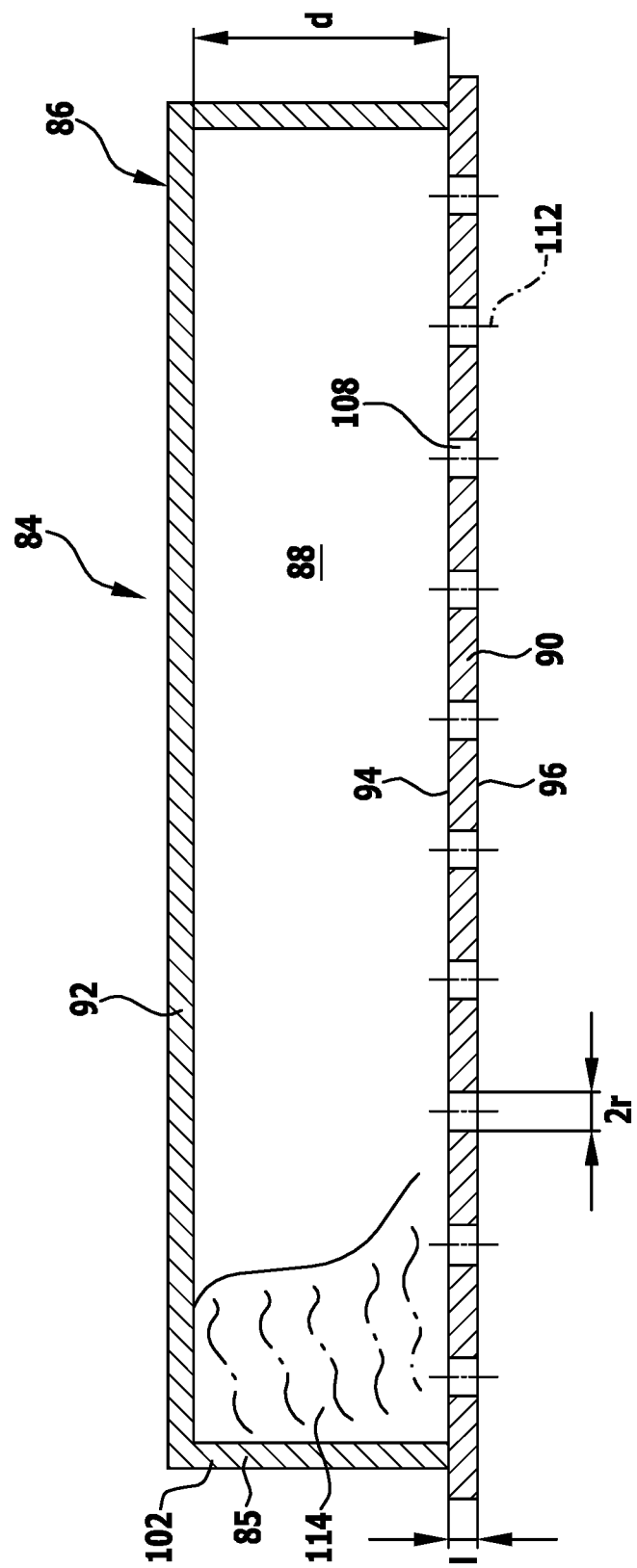
FIG. 9 shows a sectional view of a perforated-plate resonator for the purposes of explaining its functioning.

In the case of a geometrical construction of the perforated-plate resonator 84 as shown in FIG. 9 with a cuboidal chamber space 88 and the transverse walls and longitudinal walls 102, 104 perpendicular to one another, wherein the wall 106 is in turn perpendicular to the perforated plate 90 and to the top wall 92, a center frequency $f_0$ is calculated as $$f_0 = \frac{c}{2\pi}\sqrt{\frac{\varepsilon}{d(l+2\pi r/4)}} \qquad (1)$$

Here, l is the thickness of the perforated plate 90 between the first side 94 and the second side 96 plus a mouth correction; d is the height of the chamber space 88 between the first side 94 of the perforated plate 90 and an inner side of the top wall 92; c is the speed of sound. (In this regard, see R. Lerch, G. Sessler, D. Wolf, "Technische Akustik" ["Technical acoustics"], Springer 2009, page 296). The stated formula applies to circular openings 108 with a diameter 2r.

The variable ε is calculated as $$\varepsilon = \text{opening area/total area} \qquad (2)$$

The opening area is in this case the opening area (mouth area) of an opening 108. The total area is the total area of the perforated plate 90 which is exposed to the noise source, that is to say which is impinged on by sound waves.

In the case of the suction means 10, the total area 10 corresponds to that area of the perforated plate 90 which faces toward the duct.

In a typical exemplary embodiment, in particular for a suction means with external-air valve device 33, the perforated-plate resonator 84 is configured such that the center frequency $f_0$ is approximately 675 Hz.

For a suction means 10 with external-air valve device, it has been possible to realize a noise reduction of the maximum level by more than 2.5 dB, and for example by more than 5 dB.

A perforated-plate resonator basically has the following characteristic variables: resonance frequency (center frequency), opening diameter, resonator height (height of the chamber space), thickness of the perforated plate, and hole spacing. For a specific application, said variables are set so as to yield a sufficient noise reduction at the maximum level, for example by more than 2.5 dB, for the relevant frequencies.

In a first exemplary embodiment of a suction unit according to the invention, the suction head 14 is modified. A guide duct 120 is arranged therein. Said guide duct 120 serves for the targeted inflow of air to the external-air valve device 33 as cleaning device.

In one exemplary embodiment (FIGS. 3 to 5), the guide duct 120 comprises a first region 122 with a first extent axis

124. The first region 122 is adjoined by a second region 126 with a second extent axis 128. The second region 126 is adjoined by a third region 130 with a third extent axis 132.

The first extent axis 124 lies transversely, and in particular perpendicularly, with respect to the second extent axis 128. The third extent axis 132 lies transversely, and in particular perpendicularly, with respect to the second extent axis 128. The first extent axis 124 and the third extent axis 132 are in particular approximately parallel to one another.

The filter 22 is situated between the first region 122 and the third region 130 (a connecting axis which connects the first region 122 and the third region 130 passes through the filter 22).

The second region 126 is situated above the external-air valve device 33.

The guide duct 120 has a C-shape or bracket shape and is seated on the combination of filter device 21 and external-air valve device 33, wherein the first region 122 and the third region 130 form, in effect, limbs which abut laterally against said combination.

The guide duct 120 has a first port 134 by means of which it is coupled to the external-air valve device 33. Via the first port 134, external air is provided to the external-air valve device 33, which external air can then flow into the suction-extraction line 24 through the passage openings of the valve holder 36 and, here, impinges with external air abruptly on the filter 22 on its clean side.

The first port 134 is formed in particular by one or more openings corresponding to the passage openings of the valve holder 36.

The first port 134 is seated on the second region 126. Said first port is in particular seated centrally on the second region 126 of the guide duct 120.

The guide duct 120 furthermore has a second port 136. The second port 136 is arranged on the first region 122. It is seated in particular at a level of the filter 22.

The second port 136 is coupled to an exhaust-air guide of the suction apparatus 26. The suction apparatus 26 provides uncontaminated exhaust air during a suction process. Said exhaust air is normally discharged to the surroundings.

In the exemplary embodiment as per FIGS. 3 to 5, exhaust air of the suction apparatus 26 is discharged entirely to the second port 136 and is thus coupled in its entirety into the guide duct 120 into the first region 122. Accordingly, an exhaust-air guide of the suction apparatus 26 is, as far as the first port 134, designed to be fluid-tight to such an extent that exhaust air is coupled entirely into the guide duct 120 at the second port 136.

The guide duct 120 furthermore has a third port 138. Said third port 138 is arranged on the third region 130.

The third port 138 opens into the surroundings 140 of the suction unit.

A housing 142 of the suction head 14 has a grille structure 144 on the third port 138.

The guide duct 120 extends between the second port 136 and the third port 138. Exhaust air which enters the guide duct 120 via the second port 136 emerges into the surroundings 140 at the third port 138 if no filter cleaning process is performed.

The first port 134 is situated centrally between the second port 136 and the third port 138.

It is also possible for air from the surroundings 140 to enter the guide duct 120 at the third port 138 and flow to the first port 134.

The second port 136 and the third port 138 are arranged on opposite housing side regions 146a, 146b. The combination of filter device 21 and external-air valve device 33 is positioned between the second port 136 and the third port 138.

In terms of flow guidance and also geometrically, the first port 134 is situated between the second port 136 and the third port 138.

A perforated-plate resonator 148 with a perforated plate 150 is arranged on the guide duct 120 in the suction head 14 at the second region 126. Here, the perforated plate 150 is situated opposite the first port 134.

The guide duct 120 has a wall 152 in the second region 126. The perforated plate 150 forms a part 154 of said wall 152.

The wall 152 has, outside the part 154, a region 156 which is situated at least partially above the first region 122 and the third region 130. The corresponding region 156 is of fluid-tight form.

In one exemplary embodiment, the perforated plate 150 has a greater length in the second extent axis 128 than the first port 134 has in said direction.

The perforated-plate resonator 148 with the perforated plate 150 is basically configured, and functions, as described above on the basis of the perforated-plate resonator 84.

In the exemplary embodiment shown in FIGS. 3 to 5, the perforated plate 150 is of angled form. It comprises a first region 158, a second region 160 and a third region 162. The first region 158 and the third region 162 are seated in each case oppositely at a side of the second region 160. They lie at an angle with respect to the second region 160 at an obtuse angle, for example in the region of 10°.

The first region 158 and the third region 162 continue in particular in a flush manner into the regions 156.

Provision may be made for a fluid seal to be arranged between the perforated plate 150 and the regions 156.

In the exemplary embodiment described, the perforated plate 150 is configured such that the guide duct 120 is, at the second region 126, of dome-shaped form opposite the first port 134.

The perforated-plate resonator 148 has a chamber space 164 above the perforated plate 150 in the suction head 14.

In one exemplary embodiment, the perforated-plate resonator 148 is fixed to a housing cover 166. The housing cover 166 can be opened in order to allow access to the external-air valve device 33 and to the filter device 21.

Provision may be made for the perforated-plate resonator 148 to be fixedly connected to the housing cover 166. When the housing cover 166 is opened, the perforated-plate resonator is then moved conjointly with the perforated plate 150, and it is then not necessary for the perforated-plate resonator 148 to also be removed in order to allow access to the external-air valve device 33 and the filter device 21.

In the modification as per FIGS. 3 to 5, the suction unit 10 functions as follows:

Exhaust air of the suction apparatus 26 is coupled in its entirety into the guide duct 120 at the second port 136.

In FIGS. 3 to 5, exhaust air is indicated by a double arrow 167.

The exhaust air then flows through the first region 122 and the second region 126 of the guide duct 120. The exhaust air is provided to the first port 134, such that corresponding external air is available during a cleaning process of the filter 22.

Exhaust air basically flows through the guide duct 120 and emerges into the surroundings 140 at the third port 138.

At the third port 138, it is also possible for air from the surroundings 140 to flow into the guide duct 120 and thus be provided to the first port 134.

Air in the guide duct 120 flows, in the second region 126, past the perforated-plate resonator 148. The first port 134 is situated opposite the perforated plate 150 of the perforated-plate resonator 148. This results in a reduction of the noise emission.

Noises generated during the cleaning of the filter 22 are also damped.

At the perforated-plate resonator 148 (or 84), sound absorption occurs by friction of an air column against opening walls 106 of the openings 108.

The guide duct 120 is formed in the suction head 14. Said guide duct is formed in particular such that no flow barriers are contained therein. Said guide duct serves for targeted air guidance.

Defined flow guidance for exhaust air as an external-air source is provided. Exhaust air of the suction apparatus 26 is normally less contaminated than air from the surroundings 140. Effective filter cleaning is achieved in this way.

The guide duct 120 has a first inflow region 168 between the second port 136 and the first port 134, via which first inflow region external air can be provided to the first port 134. Said guide duct furthermore has a second inflow region 170 between the third port 138 and the first port 134. If for example the suction hose 18 is blocked and exhaust air is no longer provided, then it is still possible for air to flow in from the surroundings 140 in the second inflow region 170, and external air is nevertheless provided at the first port 134.

During operation of the suction apparatus 10, exhaust air flows past the external-air valve device 33 constantly (if the suction hose 18 is not blocked). This results in cooling of the electric motor device 25.

The sound emission of the suction unit 10 is reduced in an effective manner by means of the perforated-plate resonator 148.

In a further exemplary embodiment (FIGS. 6 to 8), a guide duct 180 is provided. Like the guide duct 120, the guide duct 180 comprises a first region 182, which is adjoined by a second region 184. The second region 184 is in turn adjoined by a third region 186.

With regard to extent axes, the first region 182 and the third region 186 lie transversely and in particular perpendicularly with respect to the second region 184.

On the second region 184 there is arranged a first port 188 via which, correspondingly, external air can be fed directly to the first port 134 of the external-air valve device 33.

A second port 190 is arranged on the first region 182. Via said second port 190, exhaust air from the suction apparatus 26 is coupled into the guide duct 180.

Furthermore, the guide duct 180 has a third port 192 which is positioned on the third region 186. Via the third port 192, it is possible, correspondingly to the third port 138, for air which has flowed through the guide duct 180 to emerge into the surroundings 140. Furthermore, air from the surroundings 140 can enter the guide duct 180 at the third port 192.

Furthermore, the guide duct 180 has a fourth port 194 on the third region 186.

The fourth port 194 is coupled to the exhaust-air guide of the suction apparatus 26. Exhaust air of the suction apparatus 26 enters the flow duct 180 at the fourth port 194.

Furthermore, the guide duct 180 has a fifth port 196 in the first region 182. The fifth port 196 opens into the surroundings 140. Air from the guide duct 180 can emerge into the surroundings 140 at the fifth port 196, and air from the surroundings can enter the guide duct 180.

In particular, a grille structure corresponding to the grille structure 144 is arranged at the fifth port 196.

The combination of filter device 21 and external-air valve device 33 is positioned between the first region 182 and the third region 186 of the guide duct 180. Said combination is furthermore positioned between the second port 190 and the third port 192. Said combination is furthermore positioned between the fourth port 194 and the fifth port 196.

In particular, the first port 188 is positioned centrally or symmetrically between the combination of second port 190 and fifth port 196 on one side and the combination of third port 192 and fourth port 194 on the other side.

The second port 190 and the fifth port 196 are positioned close to one another on the same housing side region. Correspondingly, the third port 192 and the fourth port 194 are positioned close to one another on the same housing side region.

Figure 7:
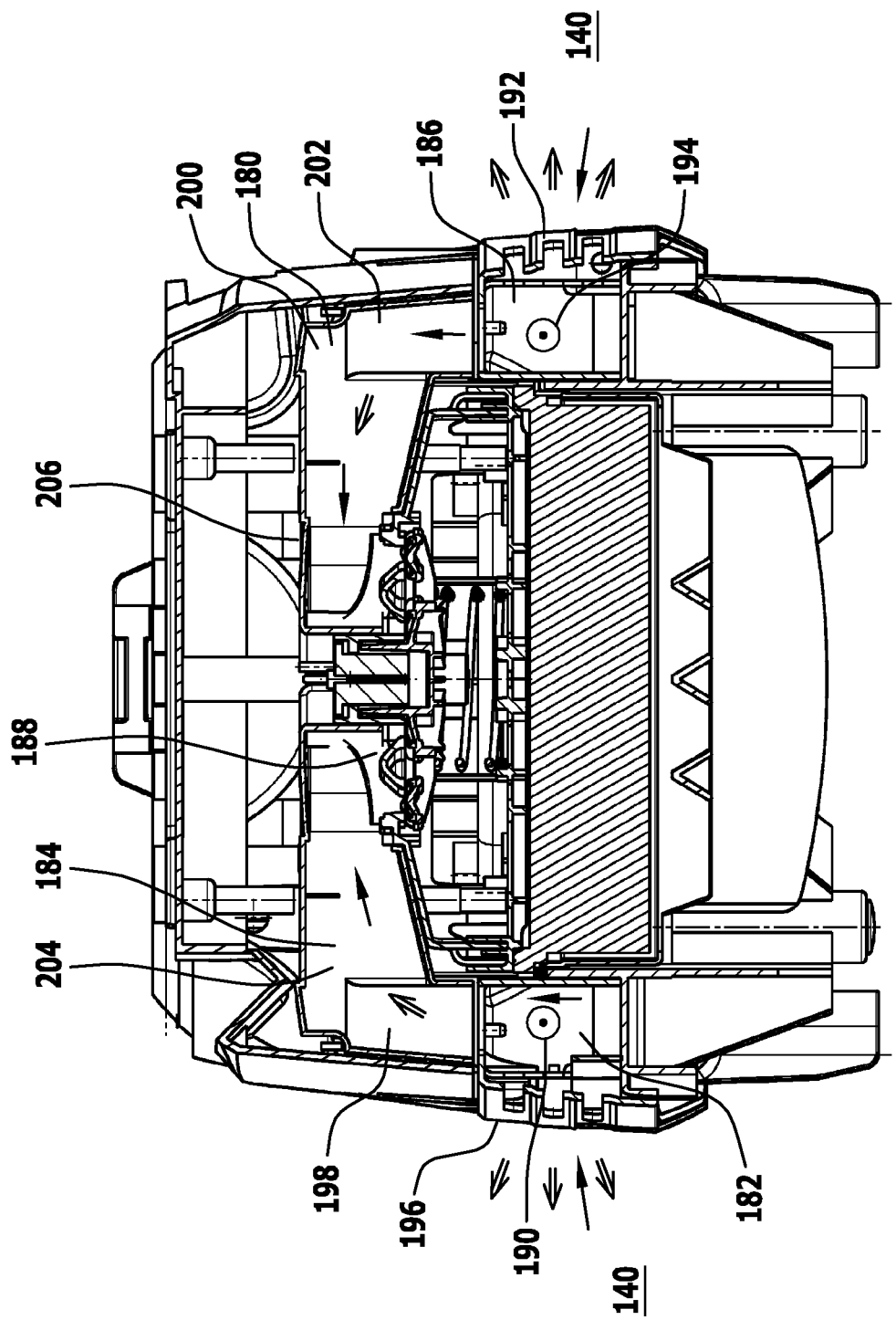
FIG. 7 shows a sectional view along the plane indicated by the line 7-7 in FIG. 6 (with mounted cover)
Figure 8:
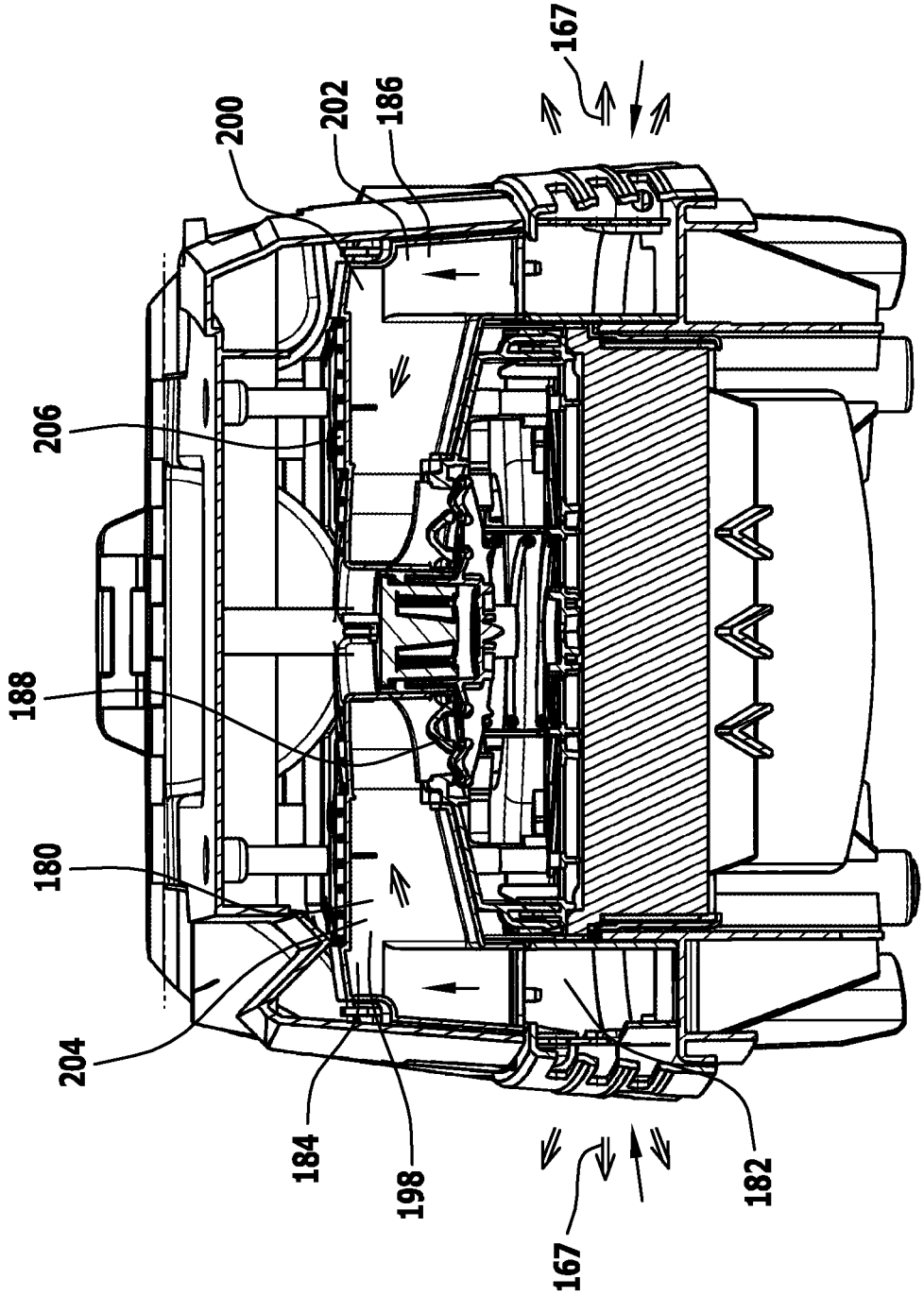
FIG. 8 shows a view similar to FIG. 7 with the section plane indicated by the line 8-8 in FIG. 6.

The guide duct 180 makes it possible to realize a first inflow region to the first port 188, which first inflow region is situated between the second port 190 and the first port 188. In FIGS. 6 to 8, said first inflow region is denoted by 198.

A second inflow region 200 is also formed on the guide duct 120. Said second inflow region is formed between the third port 192 and the first port 188.

In the first inflow region 198 and the second inflow region 200, exhaust air from the suction apparatus 96 can flow to the first port 188.

Furthermore, a third inflow region 202 is provided which is situated between the fourth port 194 and the first port 188.

Furthermore, a fourth inflow region 204 is provided which is situated between the fifth port 196 and the first port 188.

Air from the surroundings 140 can flow to the first port 188 via the third inflow region 202 and the fourth inflow region 204. This is advantageous for example if insufficient exhaust air is available (for example owing to a blockage of the suction hose 18).

The first inflow region 198 and the fourth inflow region 204 overlap. The second inflow region 200 and the third inflow region 202 overlap.

The guide duct 180 is also of symmetrical form with regard to its ports 190, 192, 194, 196. A symmetrical inflow and outflow of exhaust air and a symmetrical flow of air from the surroundings 140 can be achieved.

A perforated-plate resonator 206 is associated with the guide duct 180.

A corresponding perforated plate is situated opposite the first port 188. Said perforated plate forms a wall of the guide duct 180.

The guide duct 180 is integrated into the suction head 14.

The embodiment as per FIGS. 6 to 8 functions basically in the same way as the embodiment as per FIGS. 3 to 5.

By means of the guide duct 120 or 180 in the suction head 14, it is ensured that stored air and incoming exhaust air and additionally air entering from the surroundings 140 are provided as external air for a cleaning process. By means of the exhaust air of the suction apparatus 26, external air with a positive pressure is provided. The external air of the suction apparatus 26, that is to say process air, assists the cleaning. External air with a sufficient volume flow and with a sufficient positive pressure for the cleaning process is provided.

By means of air from the surroundings 140 which can flow in the guide duct 120 or 180 and which is provided to the first port 134 or 188, the flow resistance is reduced.

In the exemplary embodiment as per FIGS. 3 to 5, the entirety of the exhaust air is conducted in targeted fashion via the first port 134. In said embodiment, effective noise minimization is realized.

In the solution according to the invention both according to FIGS. 3 to 5 and according to FIGS. 6 to 8, exhaust air is used entirely, or exhaust air is used in a considerable fraction, as external air. Exhaust air is filtered air and is consequently cleaner. In this way, the service life of the suction apparatus 26 is lengthened.

LIST OF REFERENCE DESIGNATIONS

10 Vacuum cleaner
12 Dirt collection container
14 Suction head
16 Suction inlet
18 Suction hose
20 Suction outlet
21 Filter device
22 Filter
24 Suction-extraction line
25 Electric motor device
26 Suction apparatus
27 Electric motor
28 Blower
29 Exhaust-air opening
30 Suction flow
32 Dirty side
33 Cleaning device, external-air valve device
34 External-air valve
36 Valve holder
38 Valve disk
40 Closing spring
42 Filter holder
44 Stop spring
46 Lateral opening
48 Clean side
50 Electromagnet
52 Ring-shaped space
54 Guide sleeve
56 Iron plate
58 Face edge
62 Control device
64 Battery
68 Battery compartment
70 Flap
82 Pushbutton
84 Perforated-plate resonator
85 Chamber
86 Chamber wall
88 Chamber space
90 Perforated plate
92 Top wall
94 First side
96 Second side
102 First longitudinal wall
104 Second longitudinal wall
106 Wall
108 Opening
112 Direction of extent
114 Sound-absorbing material
120 Guide duct
122 First region
124 First extent axis
126 Second region
128 Second extent axis
130 Third region
132 Third extent axis
134 First port
136 Second port
138 Third port
140 Surroundings
142 Housing
144 Grille structure
146a, b Housing side region
148 Perforated-plate resonator
150 Perforated plate
152 Wall
154 Wall portion
156 Region
158 First region
160 Second region
162 Third region
164 Chamber space
166 Housing cover
167 Exhaust air
168 First inflow region
170 Second inflow region
180 Guide duct
182 First region
184 Second region
186 Third region
188 First port
190 Second port
192 Third port
194 Fourth port
196 Fifth port
198 First inflow region
200 Second inflow region
202 Third inflow region
204 Fourth inflow region
206 Perforated-plate resonator

The invention claimed is:

1. A suction unit comprising
a suction apparatus;
a dirt collection container;
a filter device, wherein the dirt collection container is connected in terms of flow via the filter device to the suction apparatus;
a cleaning device for the filter device, which cleaning device comprises an external-air valve device; and
at least one guide duct for air, which at least one guide duct has a first port which is connected in terms of fluid action to the cleaning device for the provision of external air from the at least one guide duct, a second port for the coupling of exhaust air of the suction apparatus into the at least one guide duct, and a third port which is connected in terms of fluid action to the surroundings of the suction unit;
wherein air from the surroundings is configured to flow into the at least one guide duct via the third port.

2. The suction unit as claimed in claim 1, wherein the third port is formed such that exhaust air of the suction apparatus is configured to emerge into the surroundings at said third port.

3. The suction unit as claimed in claim 1, wherein the at least one guide duct extends between the second port and the third port.

4. The suction unit as claimed in claim 1, wherein the first port is, at least one of (i) with regard to flow guidance and (ii) geometrically, positioned between the second port and the third port.

5. The suction unit as claimed in claim 1, wherein the at least one guide duct has a first region which has a first extent axis and on which the second port is situated, a second region which has a second extent axis and on which the first port is situated, and a third region which has a third extent axis and on which the third port is situated, wherein at least one of the first extent axis and the third extent axis is oriented transversely with respect to the second extent axis.

6. The suction unit as claimed in claim 5, wherein at least one of the first region and the third region is arranged laterally adjacent to the cleaning device or filter device.

7. The suction unit as claimed in claim 1, wherein the at least one guide duct is arranged or formed at least partially on a housing region which covers at least one of the dirt collection container and the filter device and the cleaning device.

8. The suction unit as claimed in claim 1, wherein the at least one guide duct and the second port are formed such that the entirety of the exhaust air of the suction apparatus enters the at least one guide duct.

9. The suction unit as claimed in claim 8, wherein the at least one guide duct and the third port are formed such that, outside a cleaning process of the filter device, exhaust air of the suction apparatus is configured to emerge into the surroundings only at the third port.

10. The suction unit as claimed in claim 8, comprising a first inflow region for air to the first port, which first inflow region is formed between the second port and the first port, and a second inflow region which is formed between the third port and the first port.

11. The suction unit as claimed in claim 1, wherein a fourth port for exhaust air of the suction apparatus is arranged on the at least one guide duct.

12. The suction unit as claimed in claim 11, wherein a fifth port to the surroundings is arranged on the at least one guide duct.

13. The suction unit as claimed in claim 12, wherein at least one of the filter device and the cleaning device is positioned geometrically between the third port and the fifth port.

14. The suction unit as claimed in claim 12, wherein the third port and the fifth port are positioned on opposite housing sides.

15. The suction unit as claimed in claim 11, wherein at least one of the filter device and the cleaning device is positioned geometrically between the second port and the fourth port.

16. The suction unit as claimed in claim 12, wherein the at least one guide duct is formed mirror-symmetrically with respect to at least one of (i) the third port and fifth port and (ii) the second port and the fourth port.

17. The suction unit as claimed in claim 12, having a mirror-symmetrical flow guidance for the air guidance to the first port.

18. The suction unit as claimed in claim 12, wherein the fifth port is situated on the same housing side region as the second port, and the fourth port is arranged on the same housing side region as the third port.

19. The suction unit as claimed in claim 12, comprising a first inflow region for air to the first port, which first inflow region is formed between the second port and the first port, a second inflow region which is formed between the third port and the first port, a third inflow region which is formed between the fourth port and the first port, and a fourth inflow region which is formed between the fifth port and the first port.

20. The suction unit as claimed in claim 1, wherein at least one perforated-plate resonator is acoustically associated with the cleaning device, wherein the at least one perforated-plate resonator has a chamber with a chamber space and with a chamber wall and has at least one perforated plate which covers the chamber space.

21. The suction unit as claimed in claim 20, wherein the at least one perforated-plate resonator is, with respect to geometric dimensions and arrangement and form of openings in the at least one perforated plate, dimensioned with respect to a noise source such that a noise reduction at the maximum level of at least 2.5 dB is realized by means of the at least one perforated-plate resonator.

22. The suction unit as claimed in claim 20, wherein the at least one perforated-plate resonator is arranged with the at least one perforated plate opposite the cleaning device.

23. The suction unit as claimed in claim 20, wherein the at least one perforated plate is arranged on the chamber wall.

24. The suction unit as claimed in claim 20, wherein the at least one perforated plate of the at least one perforated-plate resonator has a first side, which faces toward the chamber space, and a second side, which is situated opposite the first side, wherein a multiplicity of openings is provided in the at least one perforated plate, which openings extend continuously between the first side and the second side.

25. The suction unit as claimed in claim 24, wherein at least one of the first side and the second side is of planar form.

26. The suction unit as claimed in claim 24, wherein the first side and the second side are parallel to one another.

27. The suction unit as claimed in claim 24, wherein the openings, on the first side, open into the chamber space and, on the second side, face toward the first port.

28. The suction unit as claimed in claim 27, wherein the openings, on the second side, open into the at least one guide duct.

29. The suction unit as claimed in claim 20, wherein the chamber wall has a top wall, which is situated opposite the at least one perforated plate, and a wall which is situated between the top wall and the at least one perforated plate.

30. The suction unit as claimed in claim 29, wherein the at least one perforated plate and the top wall are oriented parallel.

31. The suction unit as claimed in claim 20, wherein the at least one perforated plate is of non-planar form, and in particular has a first region, second region and third region, wherein the first region and the third region are arranged oppositely on the second region and lie at an angle with respect to the second region.

32. The suction unit as claimed in claim 20, wherein the chamber wall has a first transverse wall, a second transverse wall, a first longitudinal wall, a second longitudinal wall and a top wall, wherein the first transverse wall and the second transverse wall are spaced apart and face one another, the first longitudinal wall and the second longitudinal wall are spaced apart from one another and face one another, the first transverse wall and the first longitudinal wall are oriented transversely with respect to one another, and the top wall is oriented transversely with respect to the first transverse wall, the second transverse wall, the first longitudinal wall and the second longitudinal wall.

33. The suction unit as claimed in claim 32, wherein at least one of (i) the first transverse wall and the second transverse wall are oriented parallel, and (ii) the first longitudinal wall and the second longitudinal wall are oriented parallel.

34. The suction unit as claimed in claim 20, wherein the chamber wall is produced at least partially from an acoustically hard material.

35. The suction unit as claimed in claim 20, wherein the at least one perforated-plate resonator and in particular the at least one perforated plate forms a wall of the at least one guide duct.

36. The suction unit as claimed in claim 20, wherein the at least one perforated-plate resonator is arranged on, and in particular is fixed to, a housing cover.

37. A method for operating a suction unit, wherein the suction unit comprises a suction apparatus, a dirt collection container, a filter device, wherein the dirt collection container is connected in terms of flow via the filter device to the suction apparatus, and a cleaning device for the filter device, which cleaning device comprises an external-air valve device, in which method exhaust air of the suction apparatus is conducted in a defined manner via at least one guide duct to the cleaning device, wherein the exhaust air is discharged from the at least one guide duct via at least one port into the surroundings, and wherein the at least one port is also formed as an inlet port for air from the surroundings, such that air from the surroundings is configured to be fed through the at least one guide duct to the cleaning device.

\* \* \* \* \*